Sept. 30, 1947. W. R. WICKERHAM Re. 22,923
ALTERNATING CURRENT HOIST CONTROL
Original Filed Dec. 8, 1943 2 Sheets-Sheet 1
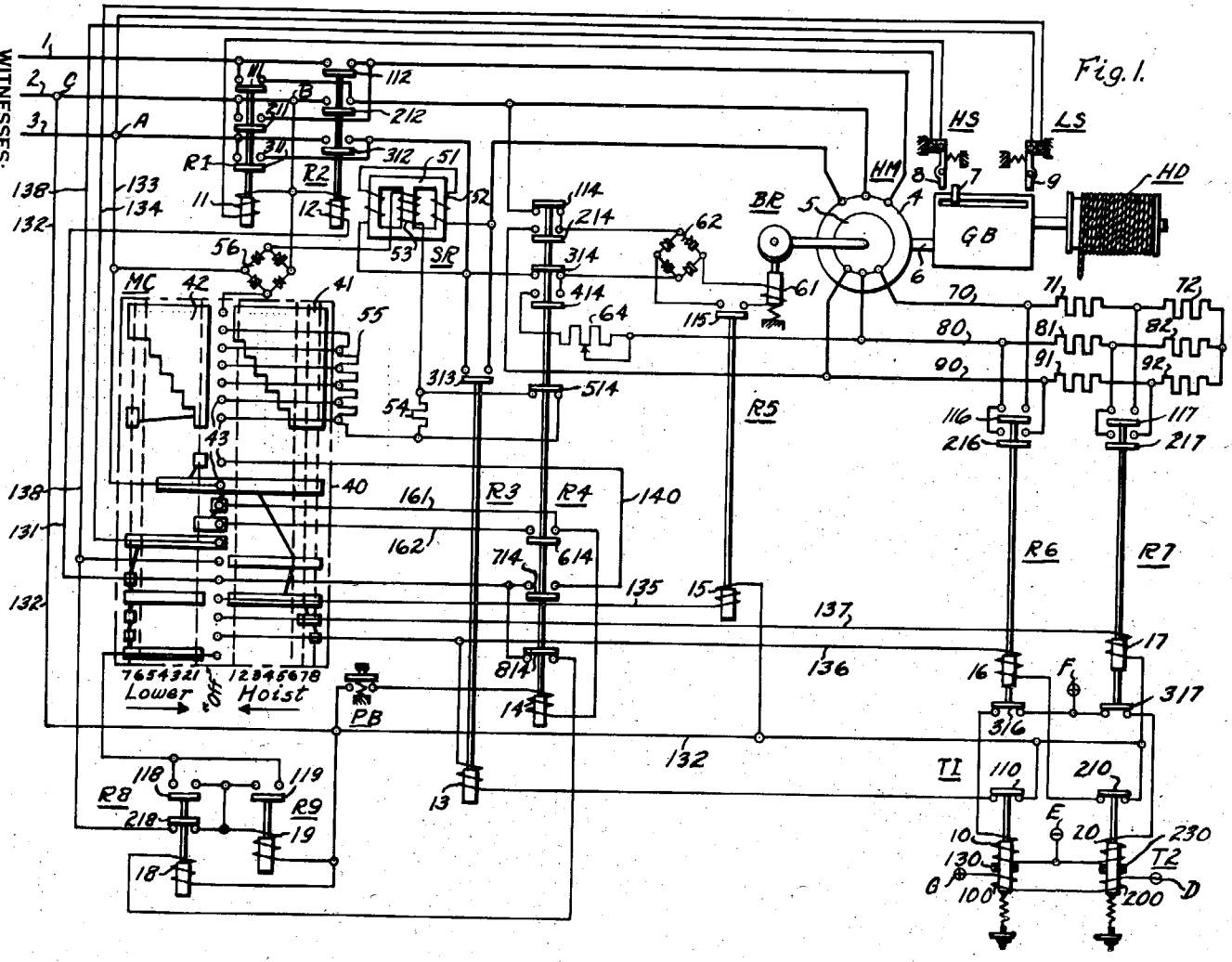
WITNESSES:
Alice L. Howell
Curt M. Avery
INVENTOR
William R. Wickerham.
BY
Paul E. Friedemann
ATTORNEY

ALTERNATING CURRENT HOIST CONTROL

Original Filed Dec. 8, 1943 2 Sheets-Sheet 2

Fig. 2.

| Controller | Position | Contactor | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | | R1 | | | R2 | | | R3 | R4 | | | | | | | R5 | R6 | | | R7 | | | R8 | | R9 | T1 | T2 |
| | | 1/1 | 2/1 | 3/1 | 1/2 | 2/2 | 3/2 | 3/3 | 1/4 | 2/4 | 3/4 | 4/4 | 5/4 | 6/4 | 7/4 | 8/4 | 1/5 | 1/6 | 2/6 | 3/6 | 1/7 | 2/7 | 3/7 | 1/8 | 2/8 | 1/9 | 1/0 | 2/0 |
| Hoist | 8 | ○ | ○ | ○ | | | | ○ | ⊗ | | ⊗ | | ⊗ | | | ⊗ | ○ | ○ | ○ | | ○ | ○ | | | ⊗ | ○ | | ⊗ |
| | 7 | ○ | ○ | ○ | | | | | ⊗ | | ⊗ | | ⊗ | | | ⊗ | ○ | | | ⊗ | ○ | ○ | | | ⊗ | ○ | | ⊗ |
| | 6 | ○ | ○ | ○ | | | | | ⊗ | | ⊗ | | ⊗ | | | ⊗ | ○ | | | ⊗ | | | ⊗ | | ⊗ | ○ | | |
| | 5 | ○ | ○ | ○ | | | | | ⊗ | | ⊗ | | ⊗ | | | ⊗ | ○ | | | ⊗ | | | ⊗ | | ⊗ | ○ | | |
| | 4 | ○ | ○ | ○ | | | | | ⊗ | | ⊗ | | ⊗ | | | ⊗ | ○ | | | ⊗ | | | ⊗ | | ⊗ | ○ | | |
| | 3 | ○ | ○ | ○ | | | | | ⊗ | | ⊗ | | ⊗ | | | ⊗ | ○ | | | ⊗ | | | ⊗ | | ⊗ | ○ | | |
| | 2 | ○ | ○ | ○ | | | | | ⊗ | | ⊗ | | ⊗ | | | ⊗ | ○ | | | ⊗ | | | ⊗ | | ⊗ | ○ | | |
| | 1 | ○ | ○ | ○ | | | | | ⊗ | | ⊗ | | ⊗ | | | ⊗ | ○ | | | ⊗ | | | ⊗ | | ⊗ | ○ | | |
| Off | 0 | | | | | | | | | | | | | | | | | | | ⊗ | | | ⊗ | | ⊗ | | | |
| Lower | 1 | ○ | ○ | ○ | | | | | 2/4, 4/4, 6/4, 7/4 Closed by PB | | | | | | | | | | | ⊗ | | | ⊗ | | ⊗ | | | |
| | 2 | ○ | ○ | ○ | | | | | | | | | | | | | ○ | | | ⊗ | | | ⊗ | | ⊗ | ○ | | |
| | 3 | ○ | ○ | ○ | | | | | ⊗ | | ⊗ | | ⊗ | | | ⊗ | ○ | | | ⊗ | | | ⊗ | | ⊗ | ○ | | |
| | 4 | ○ | ○ | ○ | | | | | ⊗ | | ⊗ | | ⊗ | | | ⊗ | ○ | | | ⊗ | | | ⊗ | | ⊗ | ○ | | |
| | 5 | ○ | ○ | ○ | | | | | ⊗ | | ⊗ | | ⊗ | | | ⊗ | ○ | | | ⊗ | | | ⊗ | | ⊗ | ○ | | |
| | 6 | ○ | ○ | ○ | | | | | ⊗ | | ⊗ | | ⊗ | | | ⊗ | ○ | | | ⊗ | | | ⊗ | | ⊗ | ○ | | |
| | 7 | | | | ○ | ○ | ○ | ○ | ⊗ | | ⊗ | | ⊗ | | | ⊗ | ○ | ○ | ○ | | ○ | ○ | | ○ | | ○ | ⊗ | ⊗ |

○ = Contact Closed Contactor Coil Energized
⊗ = Contact Closed Contactor Coil De-energized

Fig. 3.

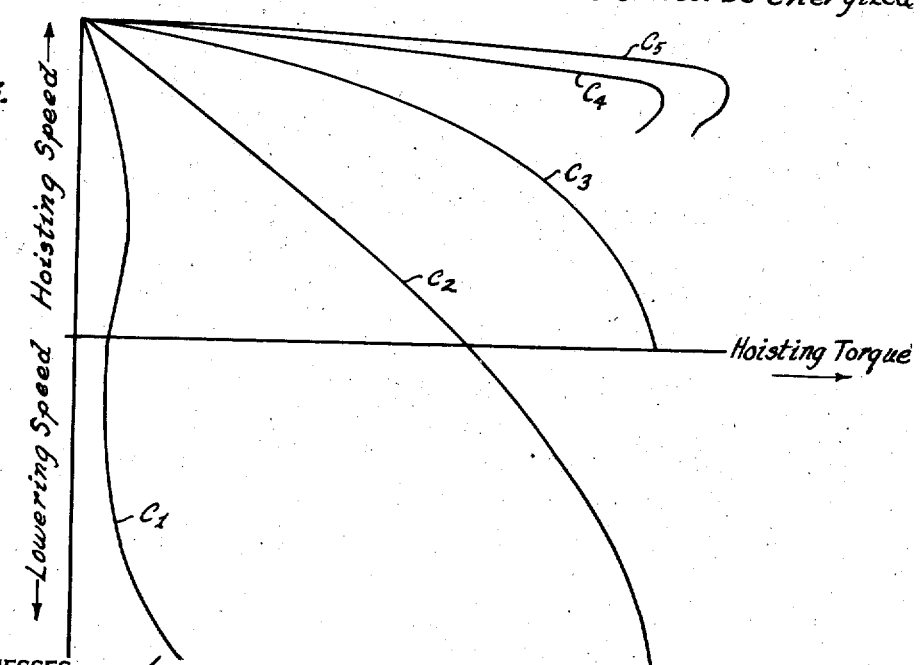

WITNESSES:
Alice S. Howell
Curt M. Avery

INVENTOR
William R. Wickerham.
BY
Paul E. Friedemann
ATTORNEY

Reissued Sept. 30, 1947

Re. 22,923

UNITED STATES PATENT OFFICE 22,923

ALTERNATING CURRENT HOIST CONTROL

William R. Wickerham, Swissvale, Pa., assignor to Westinghouse Electric Corporation, East Pittsburgh, Pa., a corporation of Pennsylvania Original No. 2,386,580, dated October 9, 1945, Serial No. 513,351, December 8, 1943. Application for reissue February 21, 1947, Serial No. 729,900

15 Claims. (Cl. 318—203)

My invention relates to alternating-current operated control systems for hoist motors on cranes, mine hoists and other hoisting and elevating devices and deals with subject matter related in some respects to that of my copending application Serial No. 513,352, entitled "Hoist control systems."

One of the objects of the present invention is to provide a hoist control system which, particularly during lowering operations, affords a high torque similar to that obtained by three-phase or so-called "counter torque" energization, while developing, when lowering, a reduced torque approaching the torque conditions of single-phase operation, when the master controller is set for low lowering speeds. In other words, the invention, in this aspect, aims at combining the advantages of multiphase and single-phase operation while avoiding or substantially reducing the disadvantages of these different types of energization.

A more specific object along these lines is to obtain a control which affords developing a high torque close to pull-out torque at high hoisting and high lowering speeds at a relatively low current input but reduces the torque to relatively slight values when setting the master controller for lowest lowering speeds.

Another object of the invention relates especially to hoist control systems in which an alternating current hoist motor, such as a wound rotor motor, has an exterior secondary or rotor circuit equipped with resistors for counter torque braking and contains control means for selectively eliminating parts or all of these resistors to provide several steps of progressive acceleration or deceleration. In the known systems of this type, just as many resistance steps are provided in the secondary circuit, requiring a corresponding number of secondary control relays, as the desired number of acceleration steps or corresponding control positions of the operator-actuated master controller. In contrast thereto, the invention aims also at providing a multi-step or wide-range acceleration control while reducing the number of secondary resistance steps and appertaining secondary contactor equipment below that heretofore necessary. For instance, the invention will achieve a control covering the ranges of, say, four to six customary control steps while using only two resistance steps in the exterior rotor circuit.

Still another object of my invention, also related to acceleration control by means of controlled resistors in the rotor circuit of an alternating-current hoist motor, is to prevent or subdue the changes of torque associated with an operator-controlled change of acceleration. That is, when advancing the master controller from one to another control point for changing the resistance in the rotor circuit, the torque tends to change suddenly; and the invention, in the present aspect, aims at reducing or cushioning this undesirable functioning.

It is also an object of my invention to permit in an alternating-current control system an operation at a limited minimum speed by automatically controlling the torque exerted by a solenoid operated mechanical brake. More particularly, it is an object to limit the speed of any alternating-current hoist motor when operating at light load or no load in the lowering direction. Another object of the invention is to limit the lowering speed even though the system is used inadvertently with heavy load present. It is furthermore aimed at rendering a separately controllable brake responsive to the operating condition of the motor so that the brake force is greater at high speed and automatically reduced as the speed decreases.

The invention also aims at providing a hoist control system in which a single master controller actuated by the operator is used for achieving the aims according to several or all of the above-mentioned objects so as to result in a control set-up of simple design and operation with the several functions performed in a predetermined relation to one another and in dependence upon the instantaneous speed or torque condition of the hoist motor.

These and other objects of the invention, will be apparent from the following description of the embodiment shown in the drawings, in which:

Figure 1 represents the circuit diagram of a complete alternating-current hoist control system in accordance with my invention, Fig. 2 is a sequence chart relating to the same system while, Fig. 3 shows explanatory speed-torque curves exemplifying the operation of such a system.

Referring to Fig. 1, the hoist motor HM is connected to the mains 1, 2 and 3 of an alternating-current line. The motor is of the wound-rotor type and has a secondary rotor circuit whose phase connections 70, 80 and 90 are provided with exterior resistors 71 and 72, 81 and 82, 91 and 92, respectively. The rotor 5 drives a shaft 6 which is coupled by a gear box GB with the hoist drum HD to be operated. A traveling nut 7 is controlled by the gear box so as to engage in one end position the movable contact member 8 of a hoist limit switch HS and in the other position the movable member 9 of a lower limit switch LS, depending upon the direction of rotation of the motor HM. A mechanical brake BR is connected with the drive shaft 6 and is electrically energized by means of a magnet coil 61.

A hoist relay R1 has its contacts 111, 211 and 311 controlled by a relay coil 11 so that when the relay is energized the motor HM is energized for running in the hoisting direction. A lowering relay R2 having contacts 112, 212 and 312 controlled by a relay coil 12 serves to energize the motor HM for operation in the lowering direction.

A saturable reactor SR has its magnetizable core 51 provided with an alternating-current coil 52 and a premagnetizing control coil 53. Coil 52 is series arranged in the phase connection 3 of the hoist motor and is wound in two sections which are so located on core 51 so that virtually no transformer effect is produced on coil 53. A reactor control relay R3 is provided to short circuit the reactor SR by the closure of relay contact 313 when the appertaining relay coil 13 is energized. When contact 313 is closed, the reactor is ineffective so that the motor HM is energized for full three-phase operation and develops a corresponding three-phase torque characteristic. When contact 313 is open, the current supplied through the phase connection 3 depends as to magnitude on the effective reactance of coil 52. This reactance is controlled by the energization supplied to the reactor control coil 53. That is, if the current in coil 53 is low, the core 51 is magnetically unsaturated and hence the reactance of coil 52 at a correspondingly high value. On the other hand, when coil 53 is magnetized to such an extent as to saturate the magnet core 51, the reactance of coil 52 is at a minimum. The range of variable reactance thus obtained is so chosen that the current in phase connection 3 is only slightly reduced when the reactor is saturated so that the motor HM is then energized for approximate three-phase operation, while when the reactor is unsaturated the effective reactance is so large that the current in phase connection 3 and the voltage across the respective primary are sufficiently suppressed to operate the motor HM in approximate single phase operation. The means for effecting the just-mentioned reactor control will be described hereinafter.

The electromagnetic brake BR has its coil 61 connected to a rectifier bridge 62 through the contact 115 of a brake relay R5 whose operating coil is denoted by 15. The rectifier bridge 62 is controlled by four relay contacts 114, 214, 314 and 414 appertaining to a relay R4. When the coil 14 of relay R4 is deenergized, contacts 114 and 314 are closed and connect the rectifier bridge to the mains 2 and 3. Consequently, in this position and assuming that contact 115 of relay R5 is closed, the brake coil 61 is energized from a substantially constant current source so that the brake is fully released. When coil 14 of brake relay R4 is energized, contacts 114 and 314 are opened and contacts 214 and 414 closed. As a result, coil 61 is now connected through a calibrating register 64 with two leads 80 and 90 of the rotor circuit and therefore energized by a voltage sufficiently low to reduce the braking effort at zero speed without releasing the brake entirely. Since the voltage of this circuit depends on the speed of the motor, the braking force applied by the brake is now dependent on the motor speed. That is, when the speed is low, a higher voltage is applied to coil 61, thus producing a lesser braking effect than when the motor speed is high and the secondary rotor voltage correspondingly reduced. The brake relay R4 has four additional contacts 514, 614, 714 and 814 whose purpose will be discussed in a later place.

Two relays R6 and R7 are provided for controlling the resistance in the rotor circuit of the hoist motor. Relay R6 has contacts 116 and 216 which, when closed, short-circuit all of the resistors in the rotor circuit. A further contact 316 serves an auxiliary purpose and is operated together with contacts 116 and 216 by a relay coil 16. Similarly, the relay R7 has contacts 117 and 217 for shorting the resistors 72, 82 and 92 of the rotor circuit and an auxiliary contact 317 controlled by a relay coil 17.

Two auxiliary relays R8 and R9 serve to control the operation of the hoist relay R1 and R2 under certain operating conditions, as will be apparent hereinafter.

The system contains also two timing relays T1 and T2 which are controlled by the operation of the secondary relays R6 and R7. Each of these time relays has a main magnetizing coil denoted by 10 and 20, respectively, and an oppositely acting neutralizing coil denoted by 100 and 200, respectively. The neutralizing coils have a smaller number of ampere turns than the main coils and serve to afford a definite time delay. Each relay is further provided with a short circuited winding consisting, for instance, of a copper sleeve or ring 130 or 230 for increasing the time constant. Relays of this type are known as such and do not form a feature of the invention proper, although the presence of such timing means is preferable in systems according to the invention for assuring a desired time limit between the subsequent operation of relays R6 and R7, or vice versa.

When energizing the supply circuit, the terminals G and D of the series connected neutralizing coils 100 and 200 are supplied with current so that these coils remain effective during the operation of the system. Due to the dimensioning of these neutralizing coils and since their effect is in opposition to the active operation of the timing relays, the energization of the neutralizing coils does not effect the opening of the appertaining relay contacts. The main coils 10 and 20 of the timing relay are connected at E and F to a current source when the supply mains 1, 2 and 3 are energized. However, the circuit of coil 10 extends over contact 316 of relay R6 so that relay T1 closes its contact 110 only when the relay R6 is energized. Similarly, the main coil 20 of time relay T2 is active only when contact 317 of relay R7 is closed and closes contact 210 when deenergized.

In order to control the hoist motor HM for hoisting and lowering operation at different speeds, and for controlling the reactance of reactor SR in order to regulate the speed torque characteristic of the motor, a master controller MC is provided. This controller contains a plurality of contact fingers, such as those denoted by 43, which cooperate with a number of contact segments mounted on a common carrier or base 40. The two upper segments denoted by 41 and 42 serve to control the energization of the reactor control coil 53. To this end, coil 53 is connected to the master controller through a rectifier bridge 56 which is fed from points A and B or supply mains 3 and 2, respectively. The contact fingers appertaining to segments 41 and 42 are connected to taps of a resistor 55 which is arranged in the direct-current circuit of rectifier bridge 56 in series with control coil 53.

The brake control relay R4 has a coil 14 connected through conductors 161 and 162 between the master controller and a push button PB which in turn is connected to a conductor 132 leading to point C of main 2. The relay coil 14 is energized only when the push button PB is actuated and when at the same time the master controller establishes a connection of either conductor 161 or 162 with the conductor 133 leading to point A of main 3.

The operation of the system will be understood from the following description of the relay operations, and the functions performed thereby, when the master controller MC is moved from the "off" position into the hoist and lowering positions denoted in Fig. 1 by numerals 1 through 8; and 1 through 7, respectively. In the following description, reference is also had to the sequence chart of Fig. 2 which indicates the closure of the relay contacts in relation to the eight hoisting points and seven lowering points of the master controller.

According to Figs. 1 and 2, none of relays R1 through R9 are energized when the master controller is in the "off" position. Hence contacts 316, 317 and 218 are closed. As mentioned before, neutralizing coils 100 and 200 of the time relays are energized. Main coils 10 and 20 of time relays T1 and T2 are also energized through E, 10, 316, F and E, 20, 317, F. Hence contacts 110 and 210 are open. The brake BR is deenergized because contact 115 is open. The saturable reactor SR is connected in the motor circuit since contact 313 is open.

Starting from this off position, the following is a brief step by step description of a hoisting and a lowering operation.

Hoisting Operation

*Step 1*

In this position of the master controller MC, resistor 55 is connected to rectifier set 56 by segment 41 of controller MC and has its full resistance in series to the reactor control coil 53. Hoisting relay R1 is energized over B, 11, HS, 138, MC, 133, A. Contacts 111, 211 and 311 close and energize motor HM for hoisting.

Relay R5 is energized through C, 132, 15, 135, MC, 133, A, closes contact 115. Hence, brake coil 61 is connected to rectifier 62 and, R4 not being energized, is excited from the line to completely release the brake. Relays R3, R6 and R7 remain deenergized. Hence, SR is effective and the total resistance in the rotor circuit is also effective. Since the premagnetization of SR by coil 53 extends over the full value of resistance 55, SR is not saturated and its reactance at a maximum. As a result, the motor is energized for approximate single-phase operation, that is, for hoisting at low speed and low torque. The speed-torque characteristic now effective is exemplified by the positive branch of curve $C_1$ in Fig. 4.

*Step 2*

In this controller position, the uppermost section of resistor 55 is shorted by segment 41 and causes the magnetization of SR to increase and thus the reactance of coil 52 to decrease. There is no other change in the relay conditions as compared with those of Step 1.

*Steps 3 through 6*

While moving the master controller through positions 3, 4, 5 and 6, the effective resistance of series resistor 55 is progressively diminished and the reactance of SR increased, thus increasing the current in phase connection 3. As a result, the speed-torque relation approaches progressively a multi-phase characteristic. At step 6 the resistance of resistor 55 is at a minimum or zero so that the full saturating current is applied to control coil 53. In this condition, the magnet core 51 is saturated and hence the reactance of SR at a minimum. The speed-torque characteristic obtained at step 6 is represented by curve $C_2$ in Fig. 4. This characteristic approaches that of a three-phase energization of the motor. In the intermediate control steps, the torque characteristic then effective resumes a corresponding position intermediate curves $C_1$ and $C_2$.

*Step 7*

Switching from step 6 to step 7 effects no further change in the resistance of 55. However, R7 is now energized through A, 133, MC, 137, 17, 132, C and shorts 72, 82, and 92 at 117 and 217 for acceleration. The main coil 20 of T2 is deenergized by the opening of contact 317. Contact 210 closes with delay and thus prepares relay R6 for its subsequent operation. The removal of resistors 72, 82, 92 increases current input to the motor as well as the torque developed and tends to cause acceleration to curve $C_3$. The torque does not change instantaneously to $C_3$ since the increased current through SR results in a temporary reduction in voltage on the motor terminal until such time as the accelerating current has disappeared. Thus, the saturable reactor produces also a cushioning effect resulting in gradual change in the speed torque conditions.

*Step 8*

The current and torque reactions described under 7 above are repeated with the result that speed-torque characteristics as shown by curve $C_4$ are attained. More in detail, in addition to the adjustments obtained at step 7, the relay R6 is now energized over C, 132, 210, 16, 136, MC, 133, A, and shorts resistors 71, 81, 91 at 116 and 216. The opening of contact 316 effects the deenergization of coil 10 so that relay T1 closes contact 110 with delay. This brings relay R3 in over C, 132, 110, 13, MC, 133, A. Contact 313 is closed thereby shorting the reactor SR. As a result, the motor HM operates now in full three-phase energization with a correspondingly higher pull-out torque as represented by curve $C_5$ in Fig. 4.

Lowering Operation

To start the lowering operation the master controller may be moved directly through the "dead" positions 1 to 6, to the 7th position where acceleration to full speed rapidly takes place. Subsequent retardation in speed results when the controller is returned through positions 6—5—4—3—2—1. This course of actuation is considered in the following abbreviated description of a lowering operation.

*Step 7*

Relay R2 is energized through B, 12, 131, MC, 134, LS, A, so that 112, 212 and 312 are closed for running HM in the lowering direction. Relay R7 is energized through C, 132, 17, 137, MC, 134, LS, A and shorts resistors 72, 82, 92 at 117 and 217. Coil 20 of T2 is cut off at 317 so that 210 closes with delay. Relay R6 is energized by way of A, LS, 134, MC, 136, 16, 210, 132, C and shorts resistors 71, 81, 91 at 116 and 216. Hence the rotor circuit contains no exterior resistance.

The opening contacts 316 releases coil 10 of time relay T1 so that contact 110 is closed with delay. Coil 13 of R3 comes in over 110 and closes contact 313, thus shorting SR out of the primary circuit. Relay R8 comes in through C, 132, 18, 814, MC, 134, LS, A, and closes contact 118 thus energizing relay R9 through 132, 19, 118, MC, 134, LS, A. Relay R5 is energized over 132, 15, MC, 134, LS, A.

As a result, the motor operates for high-speed lowering under power and the reactor SR is ineffective so that the motor develops full three-phase torque.

*Step 6*

After passing from position 7 to position 6, the controller MC interrupts the circuit between 18 and 134 so that R8 falls off closing 218 and opening 118. Coil 12 of R2 is likewise disconnected at MC and opens 112, 212 and 312. Relay R9 remains in because coil 19 is energized from 132 through the self-sealing contact 119, and energizes R1 through B, 11, HS, 138, 218, 119, MC, 134, LS, A. Contacts 111, 211, 311 are closed for energizing the motor in opposition to the lowering load. Relay R5 remains in, maintaining 115 closed, while R6 and R7 are disconnected at MC so that resistors 71, 81, 91 and 72, 82, 92 are effective in the rotor circuit for counter torque operation. The total resistance of 55 is inserted into the direct-current circuit of SR for reduced premagnetization and increased reactance. The torque characteristic now reached is similar to the negative branch of curve $C_2$ in Fig. 4.

*Steps 5 through 1*

During these subsequent steps, the relay and contact conditions of the system remain unchanged. Merely the resistance of 55 is stepwise dimensioned by segment 42 of MC to increase the magnetization of SR in order to change from approximately three-phase torque to approximate single-phase torque. At step 1 the resistance of 55 is at a minimum or zero and hence SR set for full saturation. During steps 6 and 1, the torque characteristic assumes positions between the negative branches of curves $C_2$ and $C_1$ in Fig. 4.

It is assumed in the above description of the function of the master controller that the push button PB remains in the illustrated open position in which the relay R4 is ineffective and hence connects the brake BR to the line for constant braking force. However, the operation of the master controller affects also the condition of readiness of the push button control. In this respect, it will be seen from Fig. 1 that the coil 14 of brake relay R4 is ready for energization only when the master controller is in the "off" position so that the push button PB is connected through coil 14, lead 161 and the master controller with lead 133 attached to point A of main 3. Due to the construction of the master controller, the push button PB remains ineffective during hoisting operations as well as during the high acceleration steps of lowering operations. However, once pushed in the "off" position of the master controller, the push button PB can be kept effective over self-sealing contact 614 and lead 162 when the master controller is moved from "off" into position 1 for slow lowering operation, but is cut off at MC when MC is moved farther into positions 2 to 7. When the master controller is moved out of the "off" position before previously actuating the push button PB, the relay coil 14 cannot be energized.

The operation of relay R4 has the effect of changing the excitation of brake BR from the line to the secondary or rotor circuit of the hoist motor HM. As a result, the braking effect, when under push button control, is directly proportional to the motor lowering speed and is especially effective at high motor speeds. When controller MC is moved from "off" to lowering position 1 while button PB is kept pushed, the energization of relay R4 has the effect of actuating relay R2 through B, 12, 131, 714, 140, MC, 133, A and applies lowering power to the motor primary. At the same time, contact 514 of R4 inserts resistor 54 into the premagnetizing circuit of the reactor RS with the result of applying a fixed degree of lowering torque at zero speed. This torque falls to zero at synchronous speed, and this coupled with increasing brake torque serves to hold the motor at greatly reduced speed at light or no load as well as with normal load.

Reviewing the system and its operation, it will now be apparent that a multi-step control of the speed torque characteristic of a hoist drive is obtained which, by virtue of the above-described saturable reactor feature, requires only a small number of resistance steps in the rotor circuit of the hoist motor. It will also be seen that the system affords obtaining high multiphase torques and at the same time offers the advantage of low torques at low speed lowering also by virtue of the above explained use of a saturable reactor. Furthermore, the system as described in the foregoing prevents sudden changes of torque when changing from one to another speed torque characteristic and this is also achieved with the aid of the saturable reactor.

This utilization of a single controllable impedance device for the just-mentioned different hoist control functions is one of the salient advantages of the illustrated embodiment and contributes essentially to attaining the above-mentioned functions by relatively simple and compact devices.

Another advantage of systems according to the invention is the fact that the regulation between three phase characteristic and approximate single phase (low speed low torque) characteristic is obtained without changing the internal connections of the hoist motor. That is, a standard motor, having its primaries permanently connected with each other in delta or star connection, can be employed since the variation between these characteristics is achieved by externally connected control means, i. e., by varying the voltage distribution through a range which includes a substantially balanced three phase energization and a highly unbalanced or approximate single phase energization.

It will further be apparent that the reactor control, the control of the counter torque operation, and also the control of the push-button-actuated braking operation are effected by means of a single master controller, an advantage also favorable to a simple design and operation of the system. By combining the push button with the master controller, in particular, by placing the button in the handle or crank of the master controller, both are in effect capable of one-hand operation.

Since obvious various modifications on the basis of the above disclosure and in accordance with the gist and scope of my invention are available to those skilled in the art, I wish this specification to be understood as illustrative and not in a limiting sense.

I claim as my invention:

1. A control system comprising an alternating-current motor, multiphase circuit means for energizing said motor selectively for operation in both directions, saturable reactance means forming part of said circuit means and including premagnetizing control windings, variable energizing means connected to said windings for changing the motor energization between approximate one-phase and substantially multiphase operation, and operator-controlled selective step switch means connected to said energizing means for controlling the latter in sequential steps.

2. A hoist control system comprising an alternating-current hoist motor, three-phase circuit means for energizing said motor for hoisting and lowering operations, a saturable reactor forming part of said circuit means and having a premagnetizing control coil for varying the reactance of said reactor, a current source, and operator-controlled selective step switch means connecting said source with said coil for regulating said reactance in sequential steps.

3. A control system comprising an alternating-current motor having an energizing circuit and a rotor circuit, multiphase control means disposed in said energizing circuit for selectively operating said motor in both directions, resistors arranged in said rotor circuit, means for controlling said resistors, saturable reactance means connected in said energizing circuit and including premagnetizing control windings, variable energizing means connected to said windings for changing the motor energization between approximate one-phase and multiphase operation and master control means connected with said multiphase control means, resistor control means and energizing means for operating them sequentially in a given relation to one another.

4. A control system comprising an alternating-current motor, three-phase circuit means for energizing said motor, variable impedance means forming part of said circuit means and having an impedance range sufficient for energizing said motor by substantially single phase voltage and approximately balanced three-phase voltage, and selective control means under control by the operator and connected with said impedance means for progressively changing from said one to said other voltage.

5. A control system comprising an alternating-current motor, three-phase energizing circuit means connected to said motor, a saturable reactor having a main coil series connected to said motor in one phase of said circuit means and a control winding for varying the reactance of said main coil over a range extending from approximate single-phase to approximately balanced three-phase energization of said motor, a direct current circuit connected to said control winding and comprising a stepped resistor for supplying variable energization to said control coil, and operator-actuated control means connected to said resistor for progressively changing the energization of said control coil in order to change the energization of said motor.

6. A hoist control system comprising an alternating-current hoist motor, three-phase energizing circuit means connected to said motor for energizing it for hoisting and lowering operations, a saturable reactor having a main coil series connected to said motor in one phase of said circuit means and a control winding for varying the reactance of said main coil, an energizing circuit connected to said control coil and containing a stepped resistance device for varying the energization of said control coil to premagnetize said reactor between a minimum and maximum magnetization, and a controller having a plurality of selective control positions and containing contact means connected with said circuit means to control the latter and further contact means connected with said device for controlling its resistance stepwise in accordance with the selected controller position so that the reactance of said reactor is stepwise decreased when changing the position of said controller towards high hoisting speed and increased when changing towards high lowering speeds.

7. A hoist control system comprising an alternating-current hoist motor, multiphase circuit means for energizing said motor for hoisting and lowering operations, a saturable reactor forming part of said circuit means for varying the speed torque characteristic of said motor between predominant single-phase and multiphase operation, a master controller for controlling said circuit means and said reactor in a given relation to each other, and a separately controllable power brake associated with said motor and connected to said master controller so as to be operable only when said circuit means and reactor are set by said controller for zero speed and low speed lowering operation.

8. A hoist control system comprising a hoist motor, circuit means for energizing said motor for hoisting and lowering operations, variable impedance means connected with said motor for controlling its speed, a master controller for controlling said circuit means and said impedance means in a given sequence, said controller having an off position and a plurality of hoisting and lowering positions, a power brake associated with said motor and connected to said master controller so as to be effective in the off position and ineffective in the hoisting position of said controller, and separately actuable control means operable by the operator for releasing said brake when said master controller is in said off position.

9. A hoist control system comprising an alternating-current hoist motor having a primary energizing circuit and a secondary rotor circuit, a friction brake connected with said motor, electric means for energizing said brake normally connected to said primary circuit, a master controller having an off position and a plurality of hoisting and lowering positions and being connected with said primary and secondary circuits for operating said motor at different hoisting and lowering speeds, and separately actuated operator-controlled contact means for disconnecting said brake energizing means from said primary circuit and connecting it instead to said secondary circuit for speed-responsive operation, said contact means being electrically connected with said master controller so as to be ineffective in hoisting and high-speed lowering positions of said controller.

10. A hoist control system comprising an alternating-current hoist motor, energizing circuit means connected to said motor, a controller having an off position and hoisting and lowering positions and being connected with said circuit means to control said motor in accordance with said positions, a mechanical brake connected with said motor, current supply means for providing substantially constant energization of said brake, speed-responsive current supply means for energizing said brake in accordance with the motor speed, changeover relay interposed between said brake and said different supply means so as to normally connect said brake to said constant supply means, an operator-actuated separate switch for controlling said relay to change said brake over for energization by said speed-responsive means, said switch being connected with said controller so as to be effective for starting a changeover only in said off position, said relay having a self-sealing contact connected with said controller so as to permit maintaining said switch effective only over a limited number of low-speed lowering positions of said controller once said switch has been actuated in a proceeding off position, whereby the system affords stopping said motor at no load and low-load lowering.

11. A motor control system, comprising a multi-phase alternating-current motor, multiphase supply means connected to said motor for supplying alternating-current energization, controllable impedance means disposed in a lesser number of phases of said supply means for varying the phase distribution of said energization, a control circuit associated with said impedance means for controlling the impedance condition of the latter in response to changes of a control voltage, voltage supply means connected with said circuit for applying said control voltage thereto and having operator-actuable selective contact means for selectively varying said control voltage.

12. A motor control system, comprising a multiphase alternating-current motor, multiphase supply means connected to said motor for supplying alternating-current energization, controllable impedance means disposed in a lesser number of phases of said supply means for varying the phase distribution of said energization, control means forming part of said impedance means for controlling the impedance condition of the latter means, and voltage supply means associated with said motor and connected to said control means for providing a control voltage substantially in accordance with the speed of said motor.

13. A hoist control system comprising, in combination, an alternating circuit hoist motor having standard connected primary windings, a multiphase circuit connected to said primaries and containing variable reactor means associated with a lesser number of phases for varying the voltages of said primaries relative to each other through a range including a substantially balanced multiphase voltage distribution and a greatly unbalanced voltage distribution to obtain corresponding low speed high torque and low speed low torque characteristics respectively, and an operator actuable controller for varying the reactance of said reactor means through selective intermediate stages corresponding to speed torque characteristics intermediate the aforesaid characteristics.

14. A hoist control system comprising an alternating-current hoist motor, three-phase current supply means connected to said motor, a variable impedance device disposed in a lesser number of phases of said supply means and having an impedance range rated for changing the energization of said motor through intermediate stages between substantially balanced three-phase energization and approximate single-phase energization, and means for controlling said supply means and impedance means so as to provide approximate single-phase and intermediate energization at overhauling lowering operations and substantially balanced three-phase energization at hoisting operation of said motor.

15. A hoist control system comprising an alternating current hoist motor, three-phase current supply means connected to said motor, saturable reactor means associated with a lesser number of phases of said supply means, control windings for varying the reactance of said reactor means, circuit control means associated with said supply means for operating said motor for hoisting and lowering, and control means connected to said control windings for increasing said reactance so as to provide unbalanced energization to said motor at overhauling lowering operation.

WILLIAM R. WICKERHAM.